Feb. 16, 1937.                E. GRAY                    2,070,895
                         ELECTRIC LOCOMOTIVE
                       Filed May 15, 1933         3 Sheets-Sheet 3
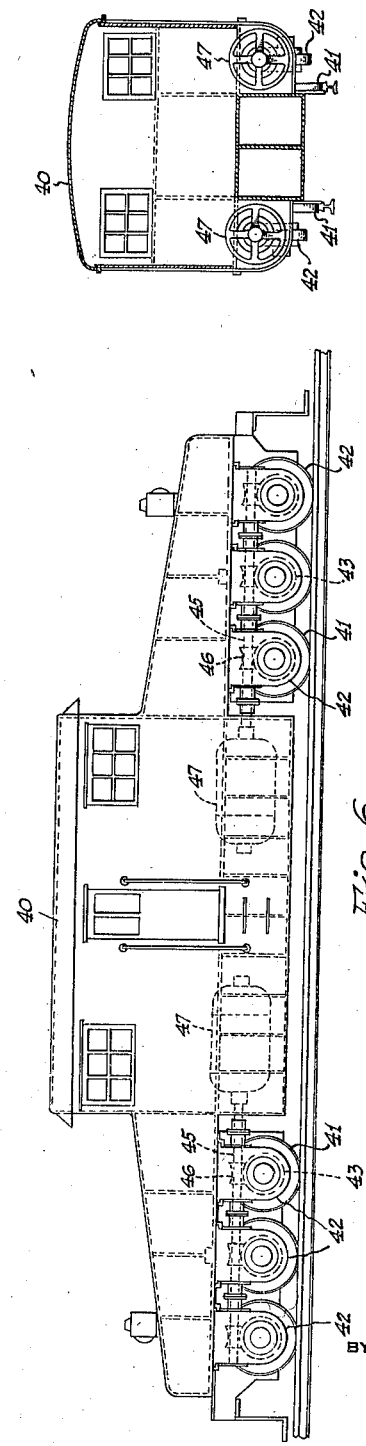
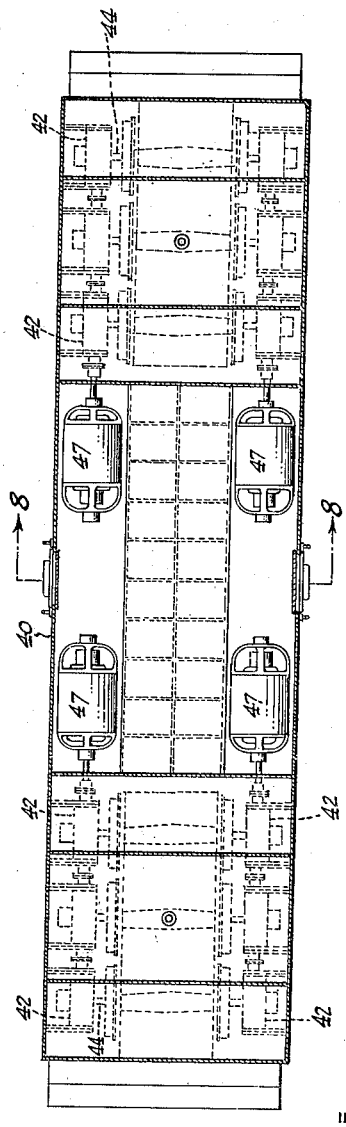
INVENTOR
EDWARD GRAY
BY
ATTORNEYS Patented Feb. 16, 1937

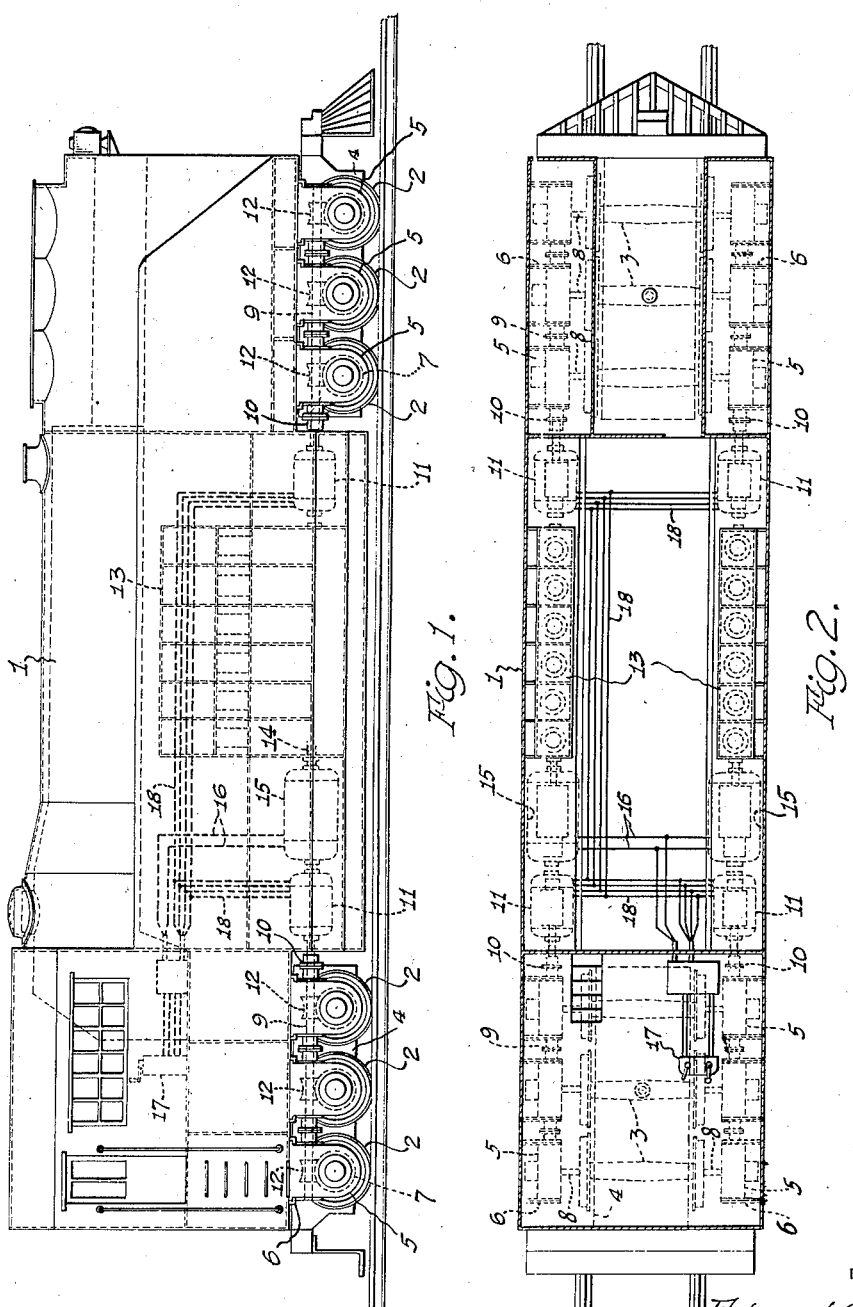

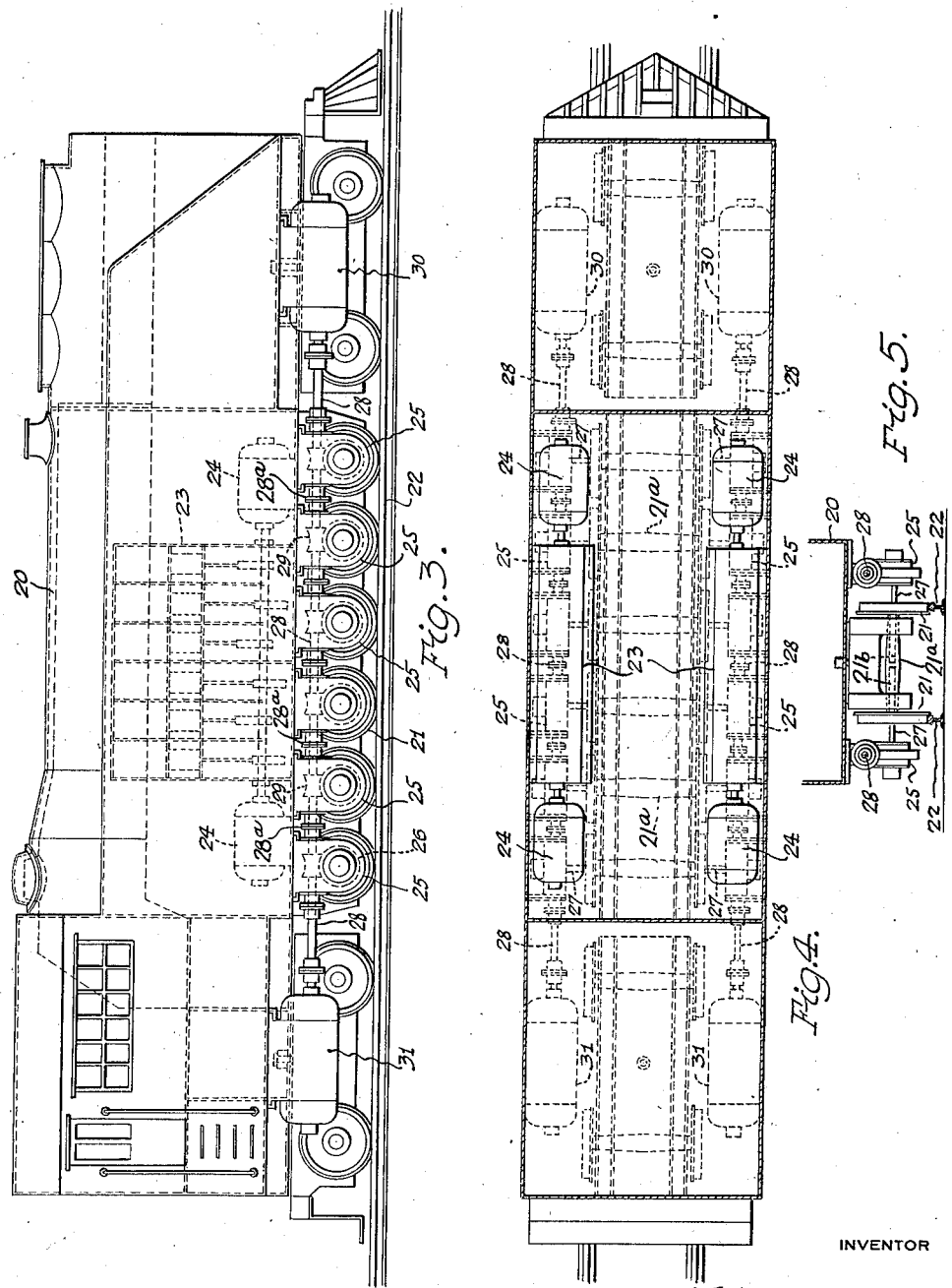

2,070,895

UNITED STATES PATENT OFFICE 2,070,895

ELECTRIC LOCOMOTIVE

Edward Gray, Detroit, Mich., assignor of one-half to Gar Wood, Detroit, Mich.

Application May 15, 1933, Serial No. 671,178

5 Claims. (Cl. 105—49)

The present invention pertains to locomotives and more particularly to electrically driven locomotives.

The primary object of the present invention is to provide a locomotive including a plurality of trucks equipped with independently rotatable wheels and driving members arranged to rotate the wheels on each side of each truck independently or simultaneously, each driving member for each set of wheels having an electrically driven motor for rotating the same.

Another object of the present invention is to provide a locomotive including independent sets of supporting wheels with an electric motor for independently driving each set and power generating means on the locomotive for operating said motors.

With the above and other ends in view the invention consists in matters hereinafter set forth and more particularly pointed out in the appended claims, reference being had to the accompanying drawings, in which—

Figure 1 is a side elevation of a locomotive;

Fig. 2 is a cross section with parts in plan;

Fig. 3 is a side elevation illustrating a modified application of the invention;

Fig. 4 is a horizontal cross section thereof;

Fig. 5 is a fragmentary transverse cross section;

Fig. 6 is a side elevation of another embodiment;

Fig. 7 is a horizontal cross section thereof, and

Fig. 8 is a cross section taken on the line 8—8 of Figure 6.

Like characters of reference are employed throughout to designate corresponding parts.

With reference to Figures 1 and 2 the numeral 1 designates a locomotive body that is ultimately supported upon wheels 2 that are mounted on axles 3 that are secured in trucks 4 in any suitable manner, the wheels 2 on opposite ends of the axles 3 being capable of independent rotation. The mounting of the wheels whereby independent rotation thereof may take place will be more particularly described later in connection with the description referring to Figs. 3, 4 and 5. Adjacent each wheel 2 there is provided a casing 5, secured to the locomotive body as at 6. In each casing 5 is mounted a worm gear 7 that is connected by a universal joint to a connector 8 and the latter by a universal joint to a wheel 2. Any suitable form of universal joint may be employed, an example being shown and claimed in my Patent 2,024,688, of December 17, 1935.

It will be understood that the number of wheels required to support the locomotive varies in accordance with the weight and size of the locomotive and that the present disclosure of three sets of wheels on each truck is by way of example only. Inasmuch as there are three wheels on each side of each truck there are provided three of the above described casings 6 and a drive shaft 9 extends through the three casings and is connected as at 10 to an electric motor 11 supported within the locomotive body 1. The drive shaft 9 has a plurality of worms 12 thereon, there being a worm 12 meshing with each worm gear 7.

From the foregoing it becomes apparent that upon operation of a motor 11 the drive shaft 10 connected thereto is caused to rotate worms 12, worm gears 7 and wheels 2. Four such motors are provided, two being provided to drive the two sets of wheels on the front truck, and two being provided to drive the two sets of wheels on the rear truck, or in other words two motors are provided to drive fore and aft wheels on one side of the locomotive and two motors are provided to drive fore and aft wheels on the other side of the locomotive.

Within the body 1 of the locomotive is provided a dual power plant of any suitable known construction, either an internal combustion or steam engine, or a combined steam and Diesel engine. The numeral 13 designates an engine having an engine shaft 14, there being one of such engines arranged on each side of the locomotive body. Each engine shaft 14 is connected to a generator 15 and the current produced by each generator is carried by lines 16 to a control device 17, and from the control device 17 through wires 18 to the motors 11.

With reference to Figures 3, 4 and 5 the numeral 20 designates a locomotive body beneath which a plurality of independently rotatable driving wheels 21 are mounted to traverse rails 22. The structure for independently mounting the wheels 21 comprises an axle housing 21a rotatably receiving the axle spindles 21b, there being an independent spindle for each wheel. Within the locomotive, and duplicated on each side thereof, is a power plant 23 for operating generators 24, the power plant being of any well known internal combustion or steam engine or combined steam and Diesel engines. Suspended beneath the locomotive with one adjacent each wheel 21 are a series of casings 25 having a worm gear 26 rotatably mounted therein and connected by connectors 27 to the adjacent wheel 21. The connectors 27 are connected to the gears 26 by universal joints and also to the wheels 21 by universal joints, the joints being of any suitable type, or of the type shown in and claimed in my Patent 2,024,688, issued December 17, 1935. A shaft 28 extends through all of the casings 26 and has a plurality of worms 29 thereon, there being a worm meshing with each worm gear 26. The shaft 28 is rigid for all intents and purposes, but is composed of several sections removably secured together as indicated at 28a. Such joints are also shown in the issued patent above referred to. Adjacent the forward end of the locomotive is a motor 30 connected to the forward end of the shaft 28 and adjacent the rear end of the locomotive is a motor 31 connected to the rear end of the shaft 28.

In this arrangement the electric motors 30 and 31 on opposite sides of the locomotive receive current from the generators 24 on opposite sides of the locomotive to rotate the shafts 28, worms 29, worm gears 26, connectors 27 and ultimately the wheels 21.

In Figures 6, 7 and 8 the numeral 40 indicates a locomotive body supported upon independently rotatable wheels 41. On the locomotive body adjacent each wheel is mounted a casing 42 enclosing a worm gear 43 that is connected to the adjacent wheel by a connector 44. The connector 44 is of the universal joint type referred to above. The wheels are arranged in fore and aft sets, and the wheels on opposite sides of each set are geared together by a shaft 45 having worms 46 meshing with the worm gears 43. A motor 47 is provided to rotate each shaft 45, there being four of such motors and four shafts 45.

The current supply for the motors 47 relative to this embodiment is received from an over-head trolley wire or from a third rail in the manner common to electric vehicles.

Although specific embodiments of the present invention have been illustrated and described it is to be understood that various changes may be made within the scope of the claims without departing from the spirit of the invention, and such changes are contemplated.

What I claim is:—

1. In a locomotive, a body, a plurality of independently rotatable axles mounted beneath said body, means supporting said body on said axles, wheels mounted on the ends of said axles, a rotatable element mounted directly on said body adjacent to and co-axial with each outer end of each axle, electric motors in said body, drive shafts connecting sets of said rotatable elements together in tandem, said drive shafts being co-axial with and connected to said motors, and a universally movable driving element connecting each rotatable element and the adjacent wheel.

2. In a locomotive, a body, a plurality of independently rotatable axles mounted beneath said body, means supporting said body on said axles, each of said axles being formed in two sections with the sections thereof independently rotatable, wheels mounted on the ends of said axles, a rotatable element mounted directly on said body adjacent to and co-axial with each outer end of each axle, electric motors enclosed within said body, means co-axial with said motors for connecting said rotatable elements together in tandem sets and for connecting said sets to said motors to rotate the same, and a universally movable driving element connecting each rotatable element and the adjacent wheel.

3. In a locomotive, a body formed with a motor section and an end section elevated relative thereto, a truck swivelled beneath said end section and having wheels rotatably mounted thereon, a plurality of housings beneath said elevated section with a housing located adjacent to each wheel, torque transfer elements in said housings and universally connected to adjacent wheels, a power shaft in each housing and connected to the torque transfer parts therein, a motor in said motor section, means for attaching said housings to said body with said power shafts in co-axial alignment one with another and with said motor, and means for connecting aligned power shafts together and for connecting one of said shafts to said motor.

4. In a locomotive, a body formed with end sections thereof elevated relative to the mid section, motors in said mid section, wheeled trucks swivelled beneath said end sections, housings containing torque transfer parts disposed beneath the elevated sections with the torque transfer parts universally connected to adjacent wheels on said trucks, power shafts supported by said housings and connected to the torque transfer parts therein, means for attaching said housings to said body to support said power shafts in co-axial alignment one with another and with said motors, and means connecting said shafts together in tandem sets and for connecting said sets with said motors.

5. In a locomotive, a body formed with end sections thereof elevated relative to the mid section, wheeled trucks swivelled beneath said end sections, housings secured beneath said end sections and normally supporting drive elements in co-axial relationship with the wheels on said trucks, power shafts in said housings operatively connected with said drive elements, said housings being individually secured to said body to dispose said power shafts in co-axial tandem sets with the axes thereof in a plane above the lower surface of said mid section, and motors individually mounted and housed within said mid section and supported thereby with their drive shafts in co-axial relationship with said sets of power shafts and operatively connected thereto.

EDWARD GRAY.